(12) United States Patent
Huang et al.

(10) Patent No.: US 6,894,466 B2
(45) Date of Patent: May 17, 2005

(54) ACTIVE CURRENT SHARING CIRCUIT

(75) Inventors: Hong Huang, Austin, TX (US); Chris M. Young, Austin, TX (US)

(73) Assignee: Astec International Limited, Kwun Tong (HK)

( * ) Notice: Subject to any disclaimer, the term of this patent is extended or adjusted under 35 U.S.C. 154(b) by 0 days.

(21) Appl. No.: 10/378,854

(22) Filed: Mar. 3, 2003

(65) Prior Publication Data

US 2004/0169499 A1 Sep. 2, 2004

Related U.S. Application Data

(63) Continuation-in-part of application No. 10/377,864, filed on Feb. 28, 2003, now abandoned.

(51) Int. Cl.[7] .................................................. G05F 1/44
(52) U.S. Cl. ....................................... 323/272; 323/285
(58) Field of Search ............................... 323/272, 282, 323/285; 363/65; 307/58, 82

(56) References Cited

U.S. PATENT DOCUMENTS

| | | | |
|---|---|---|---|
| 3,675,037 A | 7/1972 | Hamilton | 307/51 |
| 3,818,307 A | 6/1974 | Hamilton et al. | 321/11 |
| 4,276,590 A | 6/1981 | Hansel et al. | 363/71 |
| 4,355,240 A | 10/1982 | Hamilton | 307/44 |
| 4,703,409 A | 10/1987 | Spreen | 363/45 |
| 5,036,452 A | 7/1991 | Loftus | 363/71 |
| 5,245,525 A | 9/1993 | Galloway et al. | 363/71 |
| 5,604,669 A | 2/1997 | Strong, III | 363/17 |
| 5,808,453 A * | 9/1998 | Lee et al. | 323/224 |
| 6,150,803 A | 11/2000 | Varga | 323/282 |
| 6,191,566 B1 | 2/2001 | Petricek et al. | 323/224 |
| 6,191,964 B1 | 2/2001 | Boylan et al. | 363/89 |
| 6,215,290 B1 * | 4/2001 | Yang et al. | 323/282 |
| 6,424,129 B1 | 7/2002 | Lethellier | 323/272 |
| 6,580,256 B1 * | 6/2003 | Martindale et al. | 323/280 |
| 2002/0036486 A1 | 3/2002 | Zhou et al. | 323/272 |

OTHER PUBLICATIONS

Billings, Switchmode Power Supply Handbook, McGraw–Hill, 2nd Edition, 1999, New York, pp. 1.180–1.183, no month.

Mammano, "Current Sensing for Power Supply Designers", Texas Instruments Incorporated, pp. 1–1 through1–34 (2001), no month.

LinFinity, "A Simple Current–Sense Technique Eliminating a Sense Resistor", 6 pages (1998), no month.

Lenk, et al., Fairchild Semiconductor, "Applicaiton Bulleting AB–20, Optimum Current Sensing Techniques in CPU Converters", 4 pages (Jan. 20, 1999).

* cited by examiner

*Primary Examiner*—Gary L. Laxton
(74) *Attorney, Agent, or Firm*—Coudert Brothers LLP

(57) ABSTRACT

An active current sharing circuit that provides a plurality of paralleled DC-DC converters each having a lossless inductor-based current sensing circuit for sensing the average current of the associated DC-DC converter through its output inductor, and a means for adjusting the voltage reference coupled to each of the DC-DC converter's PWM controllers through a one pin interconnection between the converters. The circuit provides a high percentage current sharing level at lower cost, with reduced circuit wiring complexity, and fewer components. In an alternate embodiment, the inductor-based current sensing is replaced with a resistor-based current sensing, such that comparable current sharing levels are achieved albeit with higher loss.

11 Claims, 2 Drawing Sheets

ACTIVE CURRENT SHARING CIRCUIT

CROSS REFERENCE TO RELATED APPLICATIONS

This application is a continuation-in-part of application Ser. No. 10/377,864, entitled "Active Current Sharing Circuit", filed Feb. 28, 2003 now abandoned.

FIELD OF INVENTION

The present invention relates to power converters, and more particularly, to a circuit that efficiently provides active current sharing for paralleled power converters.

BACKGROUND OF THE INVENTION

Many applications require that a higher level of current and power to be delivered to a load. At the same time, modem electronic devices require small, low cost, high density power converters. The paralleling of power converters provides a way for two or more individual, small, high density power converter modules to be coupled in parallel so as to supply the required power for high current loads and to provide redundancy. It is desirable that the individual converters in the parallel configuration share the load current equally in a stable, regulated manner. Furthermore, better current sharing between the converters reduces power converter stress which increases the reliability of the paralleled converter system.

Theoretically, where two power converter modules are connected in parallel, for example, they will have current sharing levels of fifty percent each. These levels assume that relevant parameters, e.g., resistor, capacitor and inductance values, are the same for each module. In practice, due to device tolerances, etc., such an assumption is not warranted. As a result, each of the two converter modules will have different current sharing levels. It has been experimentally shown that, for conditions close to full load, paralleled converter modules typically can expect to have 1%-tolerance resistors, 1%-tolerance Pulse Width Modulation (PWM) generators, and 20% tolerance inductors. As a result, respective current sharing levels of 40% and 60% are the best to be expected in practice. A need exists for reducing this difference in current sharing levels in a low cost way.

Efficient current sharing requires a means for measuring the current. Known circuits for current sharing for parallel buck converters, for example, utilize a sense resistor in series with the output inductor for each of the paralleled converters. As illustrated in FIG. 1 and as is well known, a basic buck regulator comprises a switch 10, a diode 12, an inductor 14, and a capacitor 16, connected in a conventional way between an input terminal to which is coupled an input voltage $V_{in}$ relative to ground, and an output terminal at which the buck regulator generates a regulated output voltage $V_{out}$ relative to ground. The switch 10 is typically a power MOSFET which is controlled in a known manner by a control circuit, e.g., a pulse width modulator (not shown) that is responsive to the output voltage $V_{out}$. When the switch 10 is closed, the capacitor 16 is charged via switch 10 and inductor 14 from the input voltage $V_{in}$ to produce the output voltage $V_{out}$, which is consequently less than the peak input voltage $V_{in}$. When switch 10 is open, current through the inductor 14 is maintained via diode 12. Resistor 18 is a sense resistor connected in series between inductor 14 and the output. For current measurement, the voltage drop across the sense resistor is measured. The sense resistor must have sufficient resistance to provide a voltage that can be sensed accurately. A drawback of converter circuits that use a sense resistor is that significant power is lost in the sense resistors when the converters are providing high output currents, thereby reducing the efficiency of the converters.

In another method of sensing output current for a buck converter, current is sensed using the voltage drop across the inductor. One known example of inductor sensing is disclosed in U.S. Pat. No. 6,424,129 in which a resistor and a capacitor are connected in parallel with the output inductor. This patent has the drawback of not providing any active current sharing to enable the current levels output by paralleled converters to be adjusted.

Another method of sensing output current for a buck converter is MOSFET sensing, wherein the drain-source voltage of the MOSFET is measured when the MOSFET is switched on. The accuracy of the sensed measurement is dependent on the characteristics of the MOSFET which vary from device to device. The drain-source on resistance typically has a large tolerance that varies from device to device. The drain-source on resistance for MOSFET devices also varies with temperature and this variation is often not well defined.

A need therefore exists for a circuit that actively and efficiently controls the current output by respective power converters in a system having paralleled power converters. There is also a need for a circuit that provides this function using a lossless sensor having fewer and lower cost components.

SUMMARY OF THE INVENTION

The present invention solves the problems of prior art devices by providing, in a system comprising a plurality of paralleled converters, an active current sharing circuit that efficiently provides a load current sharing percentage for each converter connected in parallel that is approximately equal, for efficiently providing high power to a common load.

In one embodiment of the present invention, the active current sharing circuit controls two paralleled buck converters each having a lossless inductor-based current sense circuit for sensing the average current of its respective buck converter through the converter's output inductor, and a means for adjusting the feedback signal coupled to each buck converter's PWM controllers using a one pin interconnection between the converters, so as to provide a load current sharing of within the range of 40% and 60% for each converter at, or close to full load. In another embodiment, a system comprising a plurality of parallel converter power modules having active current sharing is provided. In a further embodiment, the inductor-based current sensing is replaced with a resistor-based current sensing.

The present invention overcomes the drawbacks of known circuits and methods by providing a current sharing circuit that is lower in cost, has less complicated circuit wiring, has better space-effective utilization, provides an acceptable (high) current sharing level, and minimizes interconnections of the paralleled modules, while virtually eliminating the need for circuit tuning. The embodiments of the present invention are applicable for any power converters whose current can be sensed from its output inductors and which has a voltage reference coupled to its PWM controller error op-amps that is accessible.

Consequently, the circuit of the present invention has the advantage of enabling higher load current sharing from paralleled power converters while needing only lower cost components and fewer components as compared to prior art devices.

Broadly stated, the present invention provides, in a circuit having a plurality of DC-DC converter modules, wherein each converter module has an input terminal to which an input DC voltage is coupled and an output terminal where the output DC voltage is provided, and wherein the converter modules are connected in parallel through their output terminals to a common bus connected to a load, an active current sharing system for maintaining the output current of each converter module at approximately the average current of the paralleled converter modules comprising a current sense circuit, coupled to each converter module, for detecting the output current of the converter module and for generating a current sense signal that is a function thereof; a reference circuit for generating a current share signal at a common current sharing bus that is a function of each current sense signal; and a control circuit coupled to each converter module for adjusting the output power of that respective converter module as a function of that converter module's current sense signal and the current share signal.

Broadly stated, the present invention also provides an active current sharing power system having a plurality of DC-DC converter modules, each having an input terminal to which an input DC voltage is coupled and an output terminal where the output DC voltage is provided, the converter modules being connected in parallel through their output terminals to a common bus connected to a load, each converter module comprising a buck converter for converting the input DC voltage to a regulated output DC voltage, the buck converter having a switch and an inductor connected in series between its respective input terminal and output terminal, the inductor having one end connected to its respective output terminal, a rectifier connected between the other end of the inductor and ground; and a capacitor connected between its respective output terminal and ground; a current sense circuit, coupled to the buck converter, for detecting the output current of the buck converter and for generating a current sense signal that is a function thereof, a reference circuit for generating a current share signal at a common current sharing bus that is a function of the current sense signals of each of the converter modules, and a control circuit coupled to the buck converter for adjusting the output power of the buck converter as a function of the buck converter's current sense signal and the current share signal.

BRIEF DESCRIPTION OF THE DRAWINGS

The forgoing aspects and the attendant advantages of the present invention will become more readily appreciated by reference to the following detailed description, when taken in conjunction with the accompanying drawings, wherein.

DETAILED DESCRIPTION OF THE INVENTION

Figure 2:
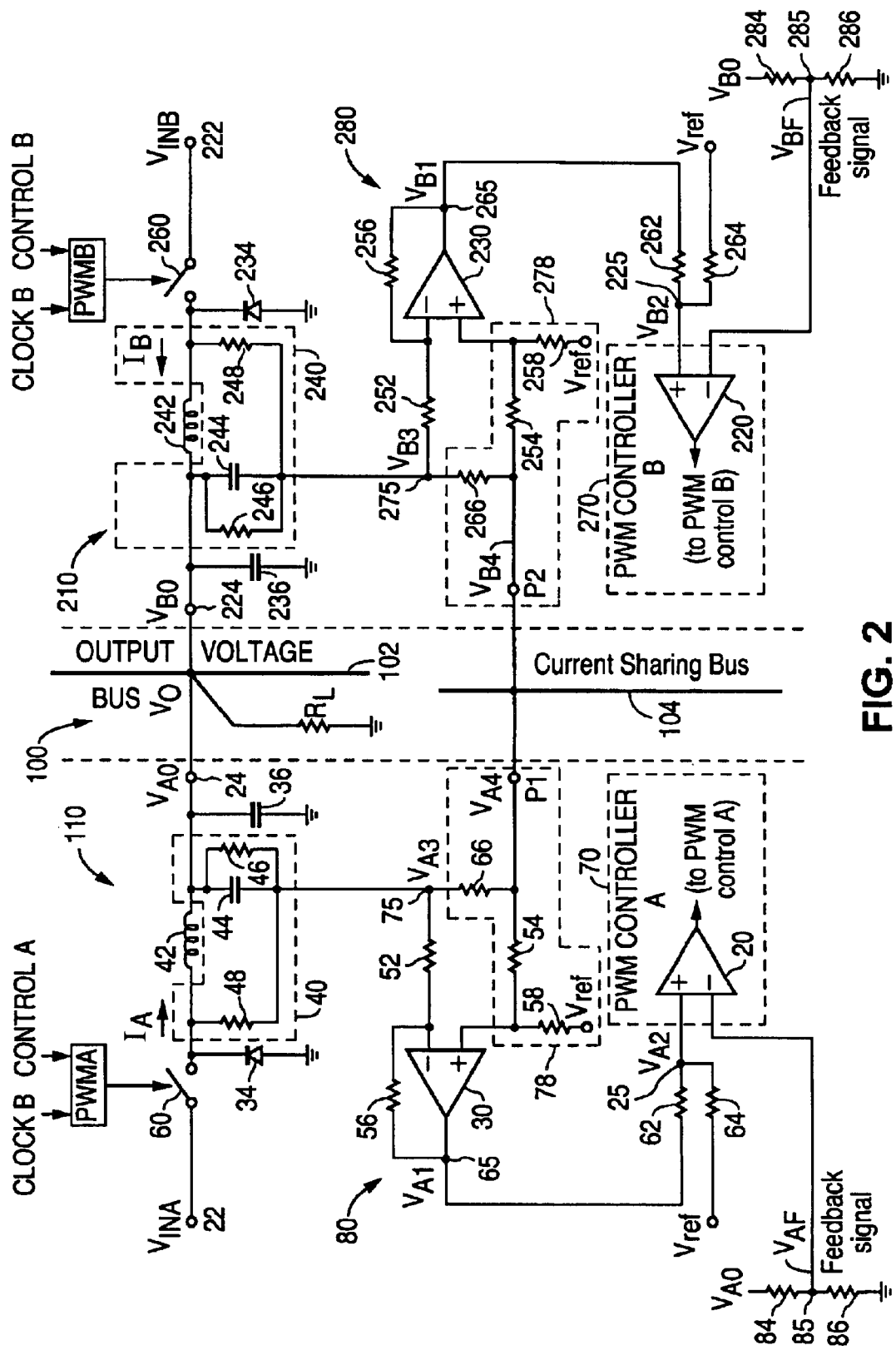
FIG. 2 shows a preferred embodiment of the active current sharing circuit for two paralleled DC Buck converters according to the present invention.

The present invention overcomes the drawbacks of known prior art circuits. A preferred embodiment of the active current sharing circuit for two paralleled DC Buck converters according to the present invention is shown in FIG. 2. The circuit 100 includes a power converter module 110 and a power converter module 210 connected in parallel. Converter modules 110 and 210 are preferably identical buck topology converters, shown as mirror images of each other in FIG. 2, having identical circuit components. As a result, the circuits and principles operating in one module also apply to the other module. Therefore, although some aspects of the converter module operation will be described solely with respect to converter module 110, the description applies to the other converter module 210. The corresponding elements in converter module 210 may also be given in parentheses herein for reference. For a preferred embodiment of FIG. 2, converter module 110 (210) has an input terminal 22 (222) to which an input DC voltage is coupled and an output terminal 24 (224) where the output DC voltage, $V_{AO}$ ($V_{BO}$) of each converter module is provided. Converter modules 110 and 210 are connected in parallel through their output terminals 24, 224 to a common output voltage bus 102 for enabling the output voltage $V_O$ on said bus to be coupled to a load, represented schematically by $R_L$.

Figure 3:
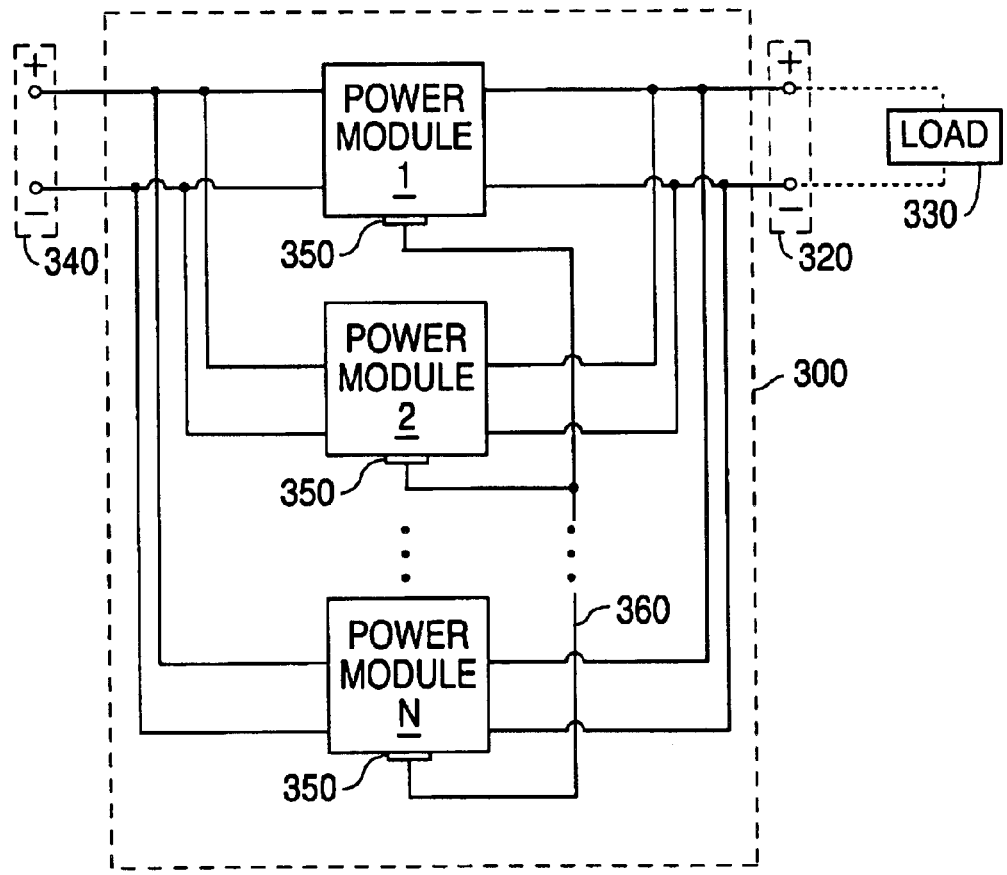
FIG. 3 is a block diagram of an embodiment of a system of power modules coupled in parallel to supply power to a load according to the present invention.

Although a preferred embodiment according to the present invention shown in FIG. 2 shows only two paralleled modules, the system of the present invention is not limited and may have any number of modules connected in parallel. FIG. 3 is a block diagram of an embodiment of a system of parallel converter modules (also referred to herein as "power modules") for supplying power to a common output voltage bus and thereby to a load according to the present invention.

As shown in FIG. 3, power module 1, power module 2, ... power module N are each coupled to a single power output port 320 for supplying power to a load. An exemplary load 330 is shown coupled to output port 320 of system 300. In a preferred embodiment, power is supplied to power modules 1 through N at a single power input port 340. It will be recognized by those skilled in the art that it is not necessary according to the present invention that power be supplied to power modules 1 through N at a single power input port. Rather, each power module may receive power from a separate power source such as separate AC-DC converters (not shown).

Each power module in system 300 has a power control terminal 350 and, as shown in FIG. 3, the power control terminals 350 of power modules 1 through N are all coupled to each other via a bus 360. As will be explained further below in connection with FIG. 2, power control terminals 350 and bus 360 enable a control circuit to compare the output current of each power module to the average output current of power modules 1 through N and to adjust the output power of each power module such that the output current of each power module approximates the average current output by power modules 1 through N.

Referring back to FIG. 2, converter module 110 includes a current sensing circuit, also referred to herein as a current sense circuit and identified as 40, a reference circuit 78, and a control circuit 80. Preferably, current sensing circuit 40 is an inductor based sensing circuit, such that there is lossless sensing. Converter module 110 includes a switch 60 connected in series with an inductor 42 between the input terminal 22 and the output terminal 24. Switch 60 is preferably controlled directly by the output of a pulse width modulator (PWM) having a clock input and control input. The PWMs are shown schematically in FIG. 2 as PWMA and PWMB, such PWM's being well known in the art. Control circuit 80 includes a PWM controller 70 that provides a control signal for the control input of the PWM.

Inductor 42 is connected in series between switch 60 and output terminal 24 which is at a voltage $V_{AO}$ as shown. The current from switch 60 into the inductor 42 is identified as IA in FIG. 2. As seen in FIG. 2, the current sensing circuit 40 is connected across inductor 42 and functions to sense the current through inductor 42. The current sensing circuit 40 preferably includes the combination of a resistor 48 connected in series with a parallel combination of a capacitor 44 and a resistor 46. Resistor 48 is connected between the input end of inductor 42 and a node 75. The parallel combination of capacitor 44 and resistor 46 is connected between the output end of inductor 42, shown at terminal 24, and node 75. The current sense signal is therefore generated at node 75.

As seen in FIG. 2, the two identical converter modules 110 and 210 are connected to a common output voltage bus 102 through their respective output voltage terminals identified as 24 at a voltage $V_{AO}$ for module 110 and 224 at a voltage $V_{BO}$ for module 210. In addition, there is an additional connection between the converter modules 110 and 210 through a separate terminal for each module referred to herein as the power control terminal and designated as P1 for module 110 and P2 for Module 210. As seen in FIG. 2, converter module 110 and converter module 210 are connected through their power control terminals to a common current sharing bus 104.

Control circuit 80 is coupled to sense circuit 40 at node 75. Reference circuit 78 is also coupled to sense circuit 40 at node 75. For converter module 110, reference circuit 78 includes a coupling of the current sense signal at node 75 through a resistor 66 to its respective power control terminal P1 which is at a voltage $V_{A4}$. Similarly, the current sense signal from converter module 210 is coupled through a resistor 266 to its power control terminal P2 which is at a voltage $V_{B4}$. Since both power control terminals P1 and P2 are connected in common to the current sharing bus 104, circuit 78 (along with circuit 278) causes a current share signal to be generated on current sharing bus 104 that is a function of each converter module's current sense signal. The current share signal is coupled to control circuit 80 in converter module 110 via a resistor 54 connected in series between power control terminal P1 and a positive input of an op amp 30. A resistor 58 is preferably connected in series between this positive input and a voltage reference identified as $V_{ref}$. $V_{ref}$ is preferably 0.9V. A resistor 52 is used to couple the current sense signal to control circuit 80. Resistor 52 is connected in series between node 75 and the negative input of the op amp 30.

The output of op amp 30, at node 65, is at a voltage identified as $V_{A1}$ in FIG. 2. A feedback resistor 56 is connected between the negative input of the op amp 30 and the output at node 65. A resistor 62 is connected in series between the output of the op amp 30 and the positive input of an op amp 20.

Referring to converter module 210, control circuit 280 is coupled to sense circuit 240 at node 275. Reference circuit 278 is also coupled to sense circuit 240 at node 275. For converter module 210, reference circuit 278 includes a coupling of the current sense signal at node 275 through a resistor 266 to its respective power control terminal P2 which is at a voltage $V_{B4}$. Since both power control terminals P1 and P2 are connected in common to the current sharing bus 104, circuit 278 (along with circuit 78) causes a current share signal to be generated on current sharing bus 104 that is a function of each converter module's current sense signal. The current share signal is coupled to control circuit 280 in converter module 210 via a resistor 254 connected in series between power control terminal P2 and a positive input of an op amp 230. A resistor 258 is preferably connected in series between this positive input and a voltage reference identified as $V_{ref}$. $V_{ref}$ is preferably 0.9V. A resistor 252 is used to couple the current sense signal to control circuit 280. Resistor 252 is connected in series between node 275 and the negative input of the op amp 230. The output of op amp 230, at node 265, is at a voltage identified as $V_{B1}$ in FIG. 2. A feedback resistor 256 is connected between the negative input of the op amp 230 and the output at node 265. A resistor 262 is connected in series between the output of the op amp 230 and the positive input of an op amp 220.

Turning again to the operation of converter module 110, an output voltage feedback signal, $V_{AF}$, at node 85 is connected to the negative input of op amp 20. The output voltage feedback signal at node 85 is preferably generated by a conventional voltage divider circuit coupled to output voltage $V_{AO}$. The positive input of op amp 20 is at node 25 at a voltage identified as $V_{A2}$. A resistor 64 is connected in series between node 25 and a voltage reference $V_{ref}$. Thus, node 25 is at the junction of resistors 62 and 64 at the positive input of the op amp 20. Traditionally, a fixed reference voltage such as that provided by $V_{ref}$ is the only signal connected to the positive input of op amp 20 which functions to output the error signal for controlling the PWM. Thus, traditionally, the output voltage feedback signal $V_{AF}$ is compared to a fixed reference and, based on the difference between the two voltages, the op amp 20 generates an error signal used by the PWM to adjust the output voltage and maintain it in regulation.

In contrast, for the embodiment of the present invention shown in FIG. 2, a signal output from op amp 30 is coupled, through a resistor 62, to node 25 to which is also coupled the fixed reference provided by $V_{ref}$. Control circuit 80 creates an apparent reference signal at the positive input of op amp 20 that is a function of the current sensed in the converter module 110 and the average output current of each of the converter modules connected in parallel. That is, control circuit 80 is responsive to the current sensed by current sensing circuit 40 at node 75, and a current share signal at the common current sharing bus 104 generated by reference circuits 78 and 278.

The output of op amp 30, at a node 65, is at a voltage identified as $V_{A1}$. This output $V_{A1}$ is coupled through a resistor 62 to the positive input of the op amp 20. The output of op amp 30 adjusts the apparent reference voltage signal $V_{A2}$ appearing at the positive input of op amp 20 at node 25. The output voltage feedback signal $V_{AF}$ at the negative input of op amp 20 is compared with the apparent reference voltage signal $V_{A2}$ at the positive input. The difference between the two inputs to op amp 20 is output as an error signal, which is a function of the difference between the output voltage $V_{AO}$ relative to the apparent reference voltage signal at node 25. This error signal, identified as PWM control A for converter 110, is the control signal for controlling PWMA. PWMA and PWMB adjust the output power of their respective converters 110 and 210.

According to the present invention, in operation, if the output current of converter module 110 is too high relative to the output current of converter module 210, the apparent reference voltage $V_{A2}$ at node 25 is lowered by the $V_{A1}$ signal. This causes the output voltage $V_{AO}$ to appear as if it is too high (because of the lower apparent reference voltage). As a result, PWM controller 70 causes the PWMA to control the switch 60 to attempt to cause the output voltage to be reduced. However, since the output voltage is also being generated by converter module 210, the result is that the current is reduced instead. For the load identified as $R_L$ in FIG. 2: $V_{A3}+V_{A4}=V_{B3}+V_{B4}$. Thus, in operation, if $I_A$ rises such that $I_A>I_B$, $V_{A3}$ rises so $V_{A4}$ lowers causing $V_{A1}$ to be lowered (below the 0.9V $V_{ref}$ level), such that $V_{A2}$ lowers, and as a result, $I_A$ is lowered, thereby providing an active current sensing real time adjustment of converter module 110. Alternatively, the adjustment sequence is as follows: if $I_A$ rises such that $I_A>I_B$, then $V_{A3}$ rises, causing $-V_{B4}$ to rise. As a result, $V_{B1}$ rises (above the 0.9V $V_{ref}$ level), causing $V_{B2}$ to rise, such that $I_B$ rises, thereby providing an active current sensing real time adjustment of converter module 210.

For circuit 110 in FIG. 2, current is sensed by measuring the voltage drop across the inductor 42. The voltage that appears at node 75, at the junction of resistors 52, 66, 46, 48, and capacitor 44, is proportional to the inductor current plus the output voltage. This voltage at node 75 is identified as $V_{A3}$ for module 110 and as $V_{B3}$ for the voltage at node 275 for the counterpart module 210. In operation, if the sensed inductor current rises, then the voltage $V_A$ increases. For a constant voltage across a fixed impedance load, the sum of $V_{A3}$ and $V_{B3}$ must be constant. Thus, if the current from module 110 increases, the current from module 210 must decrease to maintain the same sum. If the sum of $V_{A3}$ and $V_{B3}$ is allowed to change, the load voltage $V_o$ could not stay constant.

For converter module 110, the op amp 30 in conjunction with resistors 52, 54, 56, and 58 is a differential amplifier with an offset of $V_{ref}$. For the system 100 embodiment in FIG. 2, resistor 66 is preferably at a resistance value that is negligible compared to the value of resistors 52, 54 for the differential amplifier analysis. For the resistor values, if resistor 56=resistor 58 and resistor 52=resistor 54, the output, $V_{A1}$, of op amp 30 at node 65, is given by:

$$V_{A1} = V_{ref} - \frac{R56}{R52}\left[\Delta V_{A3} - \frac{\Delta V_{A3} + \Delta V_{B3}}{2}\right]$$

where $\Delta V_{A3}$ is the change in $V_{A3}$, and $\Delta V_{B3}$ is the change in $V_{B3}$.

In general, for more than two modules, this equation becomes:

$$V_{A1} = V_{ref} - \frac{R56}{R52}\left[\Delta V_{A3} - \Delta V_{AVG}\right]$$

where $\Delta V_{AVG} = \left(\frac{\Delta V_{A3} + \Delta V_{B3} + ... + \Delta V_{n3}}{n}\right)$ and where n is the number of modules connected in parallel.

Thus, the output of op amp 30, $V_{A1}$, is the reference voltage, $V_{ref}$, minus the amplified difference between $V_{A3}$ and the average of all of the corresponding changes from all of the modules in parallel. For instance, if the current $I_A$ in module 110 in FIG. 2 is higher than the average current from all of the modules, then $\Delta V_{A3}-\Delta V_{AVG}$ is a non-zero positive number. Based on the above equations, $V_{A1}$ is therefore at a voltage less than $V_{ref}$. If $V_{A1}$ is lower than $V_{ref}$, this causes the apparent reference voltage at the positive input of op amp 20 to be lower. As a result, the PWMA controller 70 is caused to control the PWMA to control switch 60 to attempt to reduce the output voltage, which in turn reduces the output current of module 110. This adjustment continues until the voltage error ($\Delta V_{A3}-\Delta V_{AVG}$) is minimized.

If the current $I_A$ in module 110 is lower than the average current from all of the modules, then the system 100 causes the opposite adjustment to occur. That is, the output voltage is increased until the difference is minimized. The other converter modules connected in parallel with module 110 adjust as module 110 adjusts. That is, for the present invention, all modules are caused to seek to reduce the difference between their own output voltage and $\Delta V_{AVG}$ accordingly.

The following is an exemplary set of parameters for module 110 for a preferred embodiment of the active current sharing circuit of the present invention shown in FIG. 2: inductor 42: 2.8 µH with DC Resistance=8 mΩ; capacitor 44: 1.0 µF; resistor 46: 1.0 kΩ; resistor 48: 10 kΩ; resistor 52: 10 kΩ; resistor 54: 10 kΩ; resistor 56: 21.5 kΩ; resistor 58: 21.5 kΩ; resistor 62: 100 kΩ; resistor 64: 10 kΩ; resistor 66: 20 Ω; $V_{ref}$: 0.9V; $I_A$: 8A; and $V_{AO}$: 1.8V.

A similar set of exemplary counterpart parameters are preferably used in the counterpart converter module 210.

Consequently, the preferred embodiment according to the present invention has the advantage of providing a circuit for non-isolated DC-DC buck converter current sharing with high percentage current sharing level, reduced cost, less complicated circuit wiring, space-effective utilization, and virtually eliminating the need for circuit tuning.

Figure 1:
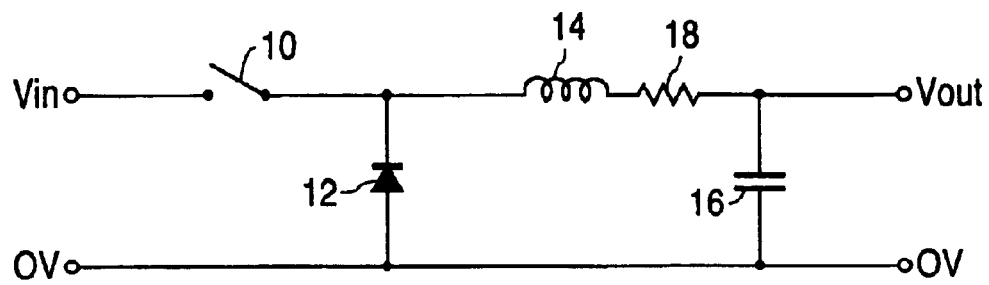
FIG. 1 shows a prior art buck converter topology having a resistor for current sensing.

An alternate embodiment according to the present invention comprises the circuit in FIG. 2 with the inductor-based current sensing being replaced with a resistor-based current sensing. For the resistor-based sensing circuit, sensing circuit 40 is replaced by a circuit having a sensing resistor in series with the inductor as shown in FIG. 1. Although this alternate embodiment might achieve comparable current sharing levels of the embodiment of FIG. 1, the resistor-based current sensing has a drawback of lower power efficiency due to the power loss in the sense resistor.

The foregoing detailed description of the invention has been provided for the purposes of illustration and description. Although exemplary embodiments of the present invention have been described in detail herein with reference to the accompanying drawings, it is to be understood that the invention is not limited to the precise embodiments disclosed, and that various changes and modifications to the present invention are possible in light of the above teaching.

What is claimed is:

1. In a circuit having a plurality of DC-DC converter modules, wherein each converter module has an input terminal to which an input DC voltage is coupled and an output terminal where the output DC voltage is provided, and wherein said converter modules are connected in parallel through their output terminals to a common bus connected to a load, an active current sharing system for maintaining the output current of each converter module at approximately the average current of the paralleled converter modules, comprising:

a current sense circuit, coupled to each said converter module, for detecting the output current of said converter module and for generating a current sense signal that is a function thereof;

a reference circuit for generating a current share signal at a common current sharing bus that is a function of each of said current sense signals; and a control circuit coupled to each said converter module for adjusting the output power of that respective converter module as a function of that converter module's current sense signal and said current share signal.

2. The system of claim 1, wherein each said converter module is a buck converter for converting said input DC voltage to a regulated output DC voltage, said buck converter having a switch and an inductor connected in series between its respective input terminal and output terminal, said inductor having one end connected to its respective output terminal, a rectifier connected between said other end of said inductor and ground and a capacitor connected between its respective output terminal and ground.

3. The system of claim 2, wherein said current sense circuit is connected in parallel across said inductor.

4. The system of claim 2, wherein said current sense circuit comprises a sensing resistor connected in series with said inductor, such that the output current of each said converter module is sensed through said sensing resistor.

5. The system of claim 1, wherein said reference circuit includes a coupling resistor and said current sense signal is coupled through said coupling resistor to said current share bus.

6. The system of claim 2, wherein a PWM controls the state of said switch, said control circuit further comprising:
   a PWM controller for providing a control signal input to the PWM; said control circuit adjusting a voltage reference coupled to said PWM controller.

7. The system of claim 3, wherein said current sense circuit connected across said inductor comprises a first resistor connected in series with a parallel combination of a second capacitor and a second resistor;
   wherein the junction of said first resistor, said second resistor, and said capacitor is at a first node.

8. The system of claim 7, wherein said control circuit comprises a first op amp having a positive input and a negative input and an output coupled to a second node; a third resistor connected in series between said first node and the negative input; and a fourth resistor connected between said negative input and the output of said first op amp at said second node.

9. The system of claim 8, further comprising a power terminal coupled to each said converter module and connected to said current sharing bus, wherein said reference circuit comprises a fifth resistor connected in series between said first node and said power terminal; a sixth resistor connected in series between said power terminal and the positive input of said first op amp; and a seventh resistor connected between a second reference voltage and the positive input of said first op amp.

10. The system of claim 9, wherein said PWM controller comprises a second op amp having a positive input connected to a third node, a negative input connected to a signal proportional to said output DC voltage, and an output providing an error signal coupled to said PWM, said PWM being responsive to said error signal to provide control of the state of said switch;
   wherein said control circuit further comprises an eighth resistor connected in series between said the output of said first op amp and said positive input of said second op amp, and an ninth resistor connected between said second reference voltage and said positive input of said second op amp.

11. An active current sharing power system having a plurality of DC-DC converter modules, each having an input terminal to which an input DC voltage is coupled and an output terminal where the output DC voltage is provided, said converter modules being connected in parallel through their output terminals to a common bus connected to a load, each said converter module comprising:
   a buck converter for converting said input DC voltage to a regulated output DC voltage, said buck converter having a switch and an inductor connected in series between its respective input terminal and output terminal, said inductor having one end connected to its respective output terminal, a rectifier connected between said other end of said inductor and ground; and a capacitor connected between its respective output terminal and ground;
   a current sense circuit, coupled to said buck converter, for detecting the output current of said buck converter and for generating a current sense signal that is a function thereof
   a reference circuit for generating a current share signal at a common current sharing bus that is a function of the current sense signals of each of said converter modules; and
   a control circuit coupled to said buck converter for adjusting the output power of said buck converter as a function of said buck converter's current sense signal and said current share signal.

* * * * *